United States Patent [19]

Pompei et al.

[11] Patent Number: 4,993,419
[45] Date of Patent: Feb. 19, 1991

[54] RADIATION DETECTOR SUITABLE FOR TYMPANIC TEMPERATURE MEASUREMENT

[75] Inventors: Francesco Pompei, Wellesley Hills, Mass.; Joseph M. Looney, Jr., Clearwater, Fla.; Philip R. Gaudet, Jr., Concord, Mass.

[73] Assignee: Exergen Corporation, Natick, Mass.

[21] Appl. No.: 280,546

[22] Filed: Dec. 6, 1988

[51] Int. Cl.⁵ .............................................. A61B 6/00
[52] U.S. Cl. .................................. 128/664; 128/736; 374/130
[58] Field of Search ................ 128/664, 736; 374/123, 374/127, 129, 132-133, 135

[56] References Cited

U.S. PATENT DOCUMENTS

| | | | |
|---|---|---|---|
| 2,658,390 | 11/1953 | Machler | 374/127 |
| 3,282,106 | 11/1966 | Barnes . | |
| 3,491,596 | 1/1970 | Dean . | |
| 3,581,570 | 6/1971 | Wortz . | |
| 3,878,836 | 4/1975 | Twentier . | |
| 3,949,740 | 4/1976 | Twentier . | |
| 4,005,605 | 2/1977 | Michael | 374/129 |
| 4,062,239 | 12/1977 | Fowler et al. . | |
| 4,456,390 | 6/1984 | Junkert et al. | 374/129 X |
| 4,566,808 | 1/1986 | Pompei et al. | 374/124 |
| 4,602,642 | 7/1986 | O'Hara et al. . | |
| 4,614,442 | 9/1986 | Poncy . | |
| 4,626,686 | 12/1986 | Pompei et al. . | |
| 4,634,294 | 1/1987 | Christol | 374/129 X |
| 4,636,091 | 1/1987 | Pompei et al. . | |
| 4,662,360 | 5/1987 | O'Hara et al. . | |
| 4,684,018 | 8/1987 | Jarund . | |
| 4,722,612 | 2/1988 | Junkert et al. | 374/133 |
| 4,784,149 | 11/1988 | Berman et al. | 128/664 |
| 4,790,324 | 12/1988 | O'Hara et al. . | |
| 4,797,840 | 1/1989 | Fraden . | |
| 4,831,258 | 5/1989 | Paulk et al. . | |
| 4,895,164 | 1/1990 | Wood | 128/736 |

FOREIGN PATENT DOCUMENTS 0092535 10/1983 European Pat. Off. .
0201790 11/1986 European Pat. Off. .
1425765 3/1973 United Kingdom .

OTHER PUBLICATIONS

Houdas et al., *Human Body Temperature* (Plenum Press: N.Y.), 83.
Det Tronics Advertisement, *InTech*, 10/87, p. 48.
Dexter Research Center Product Description for the Model 1M Thermopile Detector, Oct. 1980.

*Primary Examiner*—Max Hindenburg
*Assistant Examiner*—John P. Lacyk
*Attorney, Agent, or Firm*—Hamilton, Brook, Smith & Reynolds

[57] ABSTRACT

Tympanic temperature measurements are obtained from the output of a thermopile mounted in an extension from a housing. The housing has a temperature display thereon and supports the electronics for responding to sensed radiation. A disposable plastic sheet taken from a tape of such sheets stretches over the end of the extension between side posts. The thermopile is mounted in a highly conductive thermal mass which includes a waveguide tube. A low conductivity gaseous environment surrounding the thermopile extends through the tube. The electronics include an EEPROM in which both calibration and characterization information may be stored during a calibration procedure through an optical coupling. A capacitor and transistor associated with a switch form a simple watchdog circuit.

28 Claims, 10 Drawing Sheets

MAIN USE

CALCULATE OUTPUT PROCEDURE

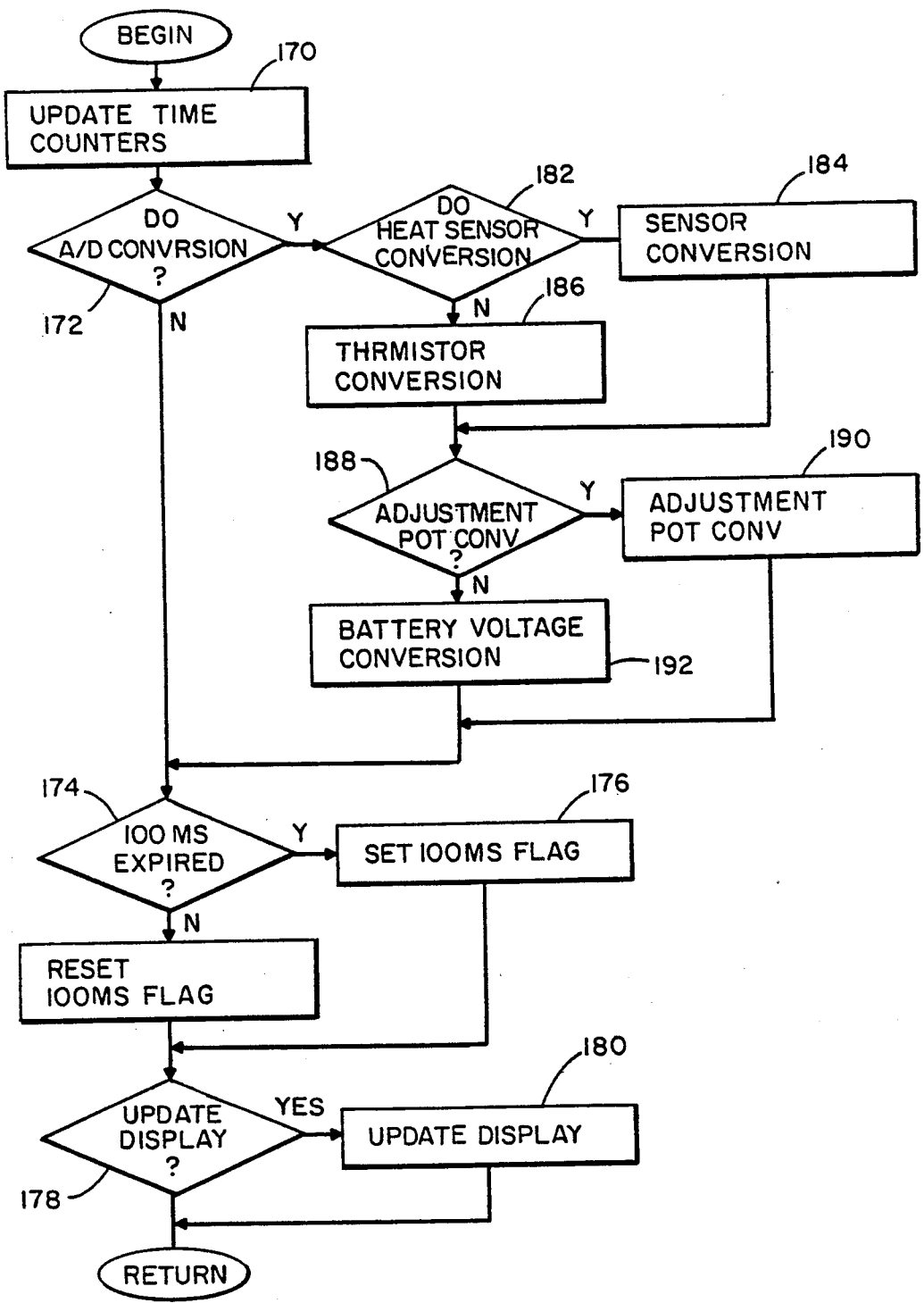
A/D CONVERSION INTERRUPT SERVICE ROUTINE FIG. 8C

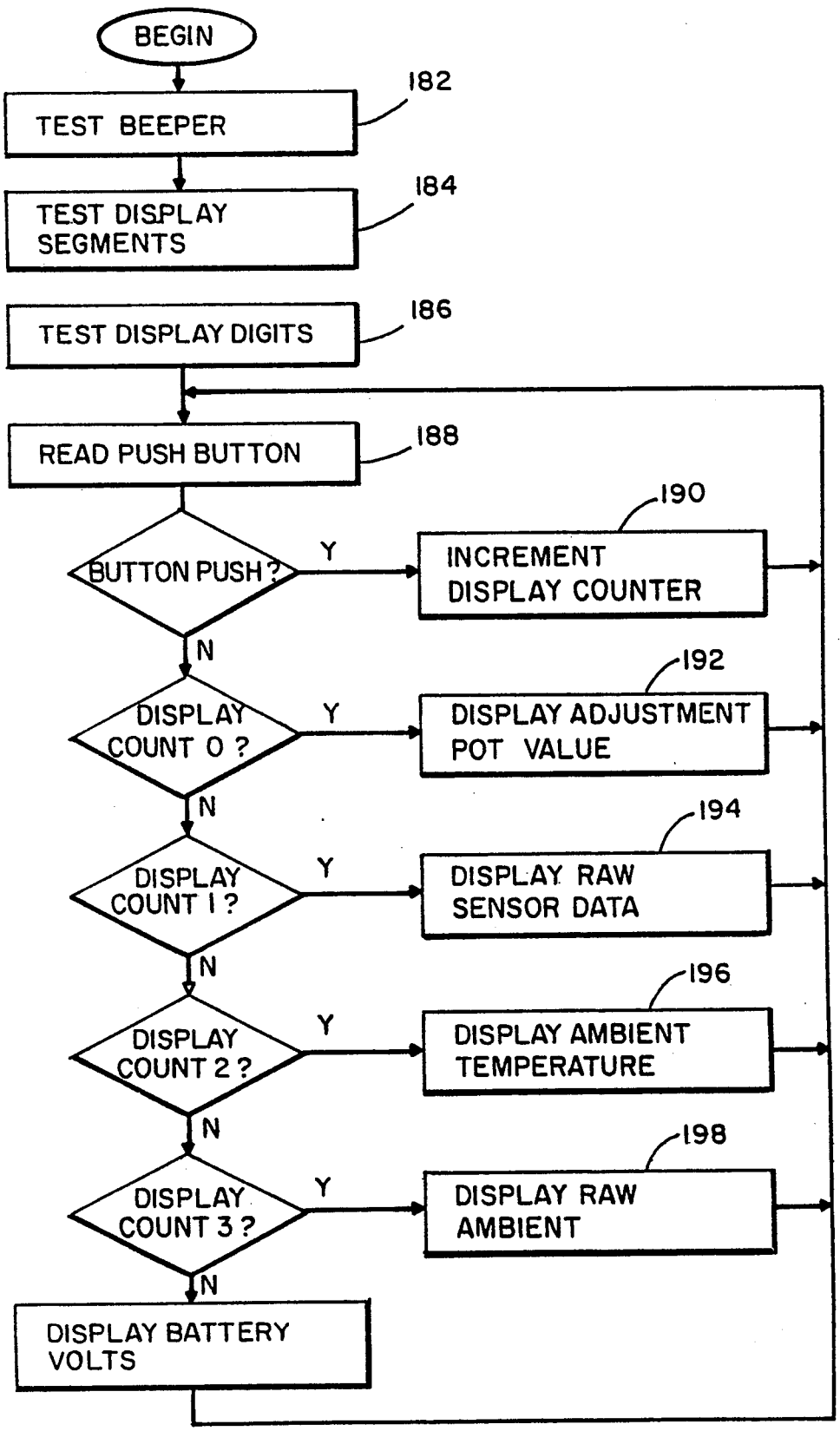
SELF TEST  FIG. 8D

RADIATION DETECTOR SUITABLE FOR TYMPANIC TEMPERATURE MEASUREMENT

The most common way of measuring a patient's temperature is by use of a sublingual thermometer, that is, one placed under the tongue. Such thermometers have suffered several disadvantages. Accuracy of a reading depends on the mouth remaining closed and the thermometer being properly positioned under the tongue. Drinking liquids or breathing through the mouth prior to taking a measurement can affect the reading. Further, the mouth is a source of mucous which presents a significant risk of cross-contamination. Also, the cost per reading of such instruments has typically been high.

One type of sublingual thermometer is the common mercury thermometer. Such thermometers have the disadvantage of taking a considerable amount of time to reach a steady state temperature in order to provide an accurate reading. Further, they are easily broken, require serialization, and are difficult to read.

As an alternative to the mercury thermometer, disposable liquid crystal thermometers are often favored. As a disposable item, the serialization requirement is eliminated, but the cost per reading is high.

To decrease the time required to obtain a patient's temperature, electronic thermometers have been developed. Such thermometers typically include a thermistor which may be positioned in a disposable cover. Although the thermometers do not reach a steady state temperature during their measurement time of 15 to 30 seconds, through electronic interpolation a steady state temperature may be estimated from the temperature readings throughout the 15 to 30 seconds. The thermometers are often cumbersome, and as with other sublingual thermometers the temperature readings may be unreliable in certain circumstances, especially when the probe is not precisely placed under the tongue.

Another electronic temperature device is a tympanic temperature measurement device. Such devices rely on a measurement of the temperature of the tympanic membrane area in the ear by detection of infrared radiation. The tympanic membrane area is often considered to be more representative of a patient's core temperature, and infrared temperature measurements using a thermopile are extremely rapid. Disposable sleeves may be placed over the radiation detector. A commercial tympanic temperature measurement device is illustrated in U.S. Pat. No. 4,602,642 to O'Hara et.al. As suggested in that patent, the infrared detection approach does present demands on the instrumentation to avoid inaccuracies due to ambient temperature and spurious heat flux to the thermopile.

SUMMARY OF THE INVENTION

The present invention relates to various features of a radiation detector which make the detector particularly suited to tympanic temperature measurements without certain deficiencies of prior tympanic temperature detectors. For example, the O'Hara et.al. system relies on heating of the radiation probe to a precise temperature to maintain calibration of the device during a test. As a result, the instrument is not usable where the ambient temperature exceeds that precise temperature. Also, to assure proper calibration for each test, the O'Hara et.al. system uses a light chopper-type of calibration unit having a target heated to approximately 98° F. Before each test, the thermopile in the probe is calibrated as it views the chopper unit target. Once removed from the chopper, the temperature reading must be obtained promptly because the probe will cool after removal from the unit and thus introduce errors. This requirement for calibration in the chopper unit prior to each temperature reading imposes a rigid protocol on the user which is more cumbersome than that of electronic thermometers. Further, the requirement for heating the target and the probe adds bulk and weight to the system. The present . invention provides for a radiation detector which is at all times properly calibrated without heating of the thermopile and without a chopper calibration unit. As a result, the instrument is less cumbersome, uses less power and provides quicker readings without having to follow an extensive protocol.

In accordance with one aspect of the present invention, a thermopile is mounted within a thermal mass and has a junction thermally coupled to the thermal mass. A thermally conductive, reflective tube is coupled to the thermal mass for guiding radiation to the thermopile from an external target. A thermal barrier surrounds the thermal mass and tube. The temperature of the thermal mass, and thus of the thermopile cold junction, is allowed to float with ambient. A temperature measurement of the thermal mass is made to compensate the thermopile output.

Temperature differences between the tube and thermopile cold junction would lead to inaccurate readings. To avoid those differences, the large thermal mass minimizes temperature changes from heat which passes through the thermal barrier, and good conductivity within the mass increases conductance and minimizes temperature gradients. The outer thermal RC time constant for thermal conduction through the thermal barrier to the thermal mass and tube is at least two, and preferably at least three, orders of magnitude greater than the inner thermal RC time constant for the temperature response of the cold junction to heat transferred to the tube and thermal mass. For prompt readings, the inner RC time constant should be about ½ second or less.

Preferably, the thermopile is mounted to a film suspended within a ring. The ring is supported on electrically conductive pins extended through an adjacent ring to the side of the film on which the thermopile is mounted. The film is spaced from the adjacent ring, and the rings and thermopile are surrounded by a low conductivity gaseous volume. Preferably, the low conductivity gaseous volume extends through the length of the conductive tube. The space between the film and the adjacent ring through which the conductors extend is filled with thermally conductive material.

The thermopile may be mounted in a can which encloses the low conductivity gaseous volume. The thermal mass may comprise an annular member which surrounds the can and a length of the tube adjacent to the can. The annular member is tapered about its outer periphery toward the tube. A conductive plug is positioned behind the can within the annular member. The can, tube, annular member and plug are bonded together by high thermal conductivity material such as solder, epoxy, or powdered metal to obtain a continuous low resistance path from the end of the tube to the cold junction of the thermopile. Alternatively, the parts may be press fit together to provide the high conductance bond. The thermal barrier comprises a sleeve spaced from the thermal mass and tube. The sleeve is tapered toward the end of the tube away from the can.

Preferably, a probe extension which supports the radiation sensor extends from a housing which displays the tympanic temperature. This housing supports battery powered electronics for converting radiation sensed by the sensor to tympanic temperature displayed by the display. The entire instrument may be housed in a single hand-held package because a chopper calibration unit is not required. The small additional weight of the electronics in the hand-held unit is acceptable because readings can be made quickly. The readings can be made in less than five seconds, and preferably in less than two seconds.

Preferably, the probe extension extends about orthogonally from an intermediate extension which extends at an angle of about 15° from an end of the housing. The surface of the extension curves outwardly along its length from its distal end following a curve similar to that of an otoscope. A sanitary cover in the form of a removable plastic sheet may be stretched over the end of the probe. The sheet may be retained on the probe by posts on the sides of the probe over which holes in the sheet are positioned.

Many of the sheets can be formed in a tape of transparent, flexible membrane segmented into individual covers by frangible lengths across the tape. The holes adapted to retain the sheet across the probe are formed to each side of each frangible length. Reinforcement tape may be positioned on the tape, and the frangible lengths may be formed as by perforations through the reinforcement tapes. In the present application, the membrane must be transparent to infrared radiation. The covers may be adapted to other measuring instruments by using membranes which are transparent, for example, to visual light, sound or the like. Polyethylene sheet is preferred for infrared measurements.

The electronics may include an optical signal detector for receiving a digital input, and an electrically erasable programmable read only memory (EEPROM). A processor is programmed to respond to input from the optical signal detector to store information in the EEPROM and to use the stored information to respond to radiation and to drive the display. The processor may also be programmed to operate in a communications mode in which it transfers information to an external optical signal detector by modulation of the display. Communications may be with an external computer through a boot which fits over the display during calibration.

The information stored in the EEPROM may include calibration information. It may also establish a range and incremental response of the display to sensed radiation and other information which characterizes the personality of a particular unit. For example, the information stored in the EEPROM may determine whether the display is in degrees Fahrenheit or degrees centigrade. That information may be controlled by a switch to which the processor responds. The system may include a sound source, and the stored information may determine the timing at which the sound source is activated. For example, the stored information may cause the display to be locked to a reading a predetermined time after the radiation detector is turned on, and the stored information may cause the sound source to be activated when the display is locked. Similarly, the stored information may cause the radiation detector to be turned off after a predetermined time and cause the sound source to be activated as the radiation detector is turned off. Alternatively, the stored information may cause the display to indicate the peak radiation sensed during a period of time and may cause the sound source to be activated when radiation sensed by the sensor approximates the peak.

The information stored in the EEPROM may cause a conversion from sensed tympanic temperature to a temperature which approximates oral and/or core temperature and which is displayed. The processor may also perform conversions based on linear approximations, and the stored information may establish the end points and slopes of the linear approximations. For example, a linear approximation may be used to determine ambient temperature from a thermistor output or to determine target temperature from a thermistor output and a thermopile output.

The electronics support a simple watchdog operation associated with the on switch to the unit. An active device is turned on by the switch to apply power to the electronics. A capacitor stores, for a limited time, a charge which holds the active device after release of the switch. The processor is programmed to periodically charge the capacitor after power is applied through the active device. Failure of the processor to follow a program routine results in discharge of the capacitor and turning off of the active device on the radiation detector. The switch may also be coupled directly to the processor so that the processor may respond to actuation of the switch after the radiation detector is turned on for other functions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 8A-8D are flow charts of the system firmware.

DESCRIPTION OF A PREFERRED EMBODIMENT

Figure 1:
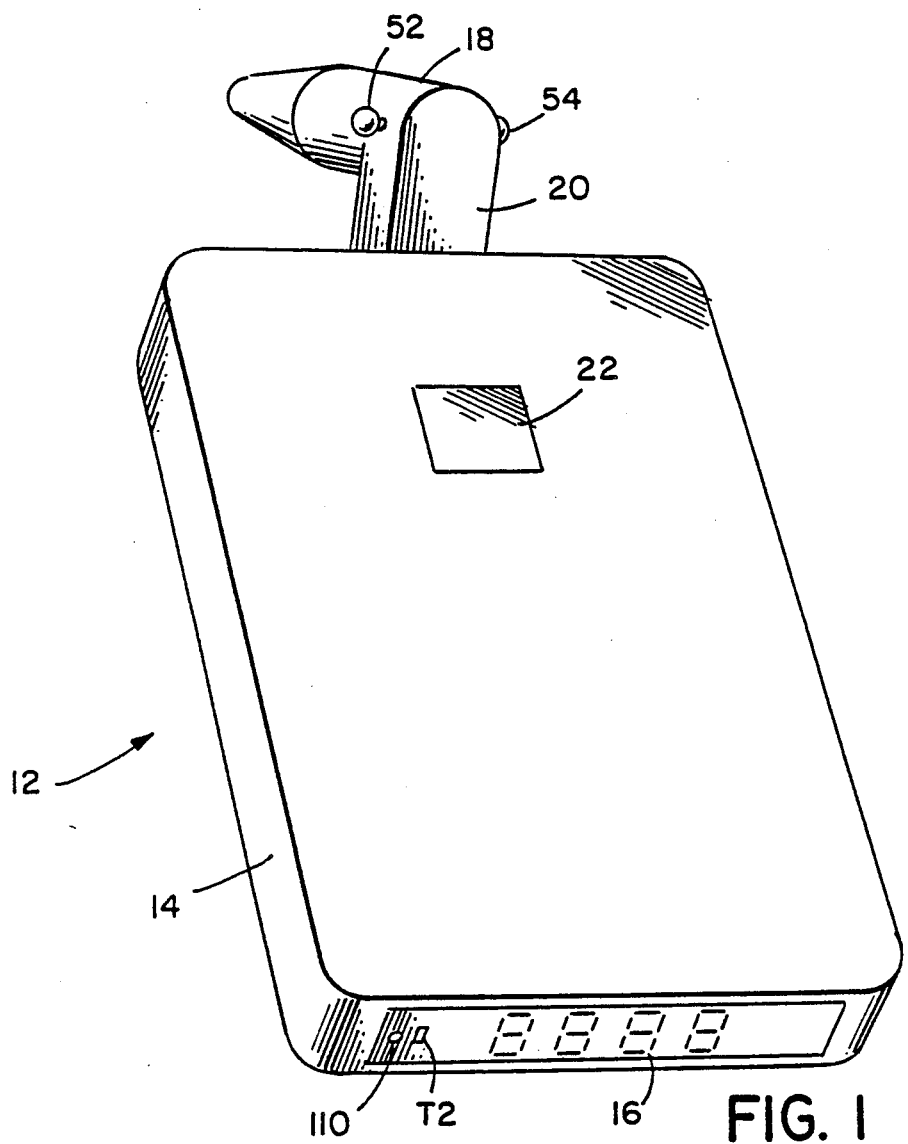
FIG. 1 illustrates a radiation detector for tympanic temperature measurements in accordance with the present invention.

The radiation detector 12 of FIG. 1 includes a flat housing 14 with a digital display 16 for displaying a tympanic temperature measurement. Although the display may be located anywhere on the housing, it is preferred that it be positioned on the end so the user is not inclined to watch it during a measurement. The instrument makes an accurate measurement when rotated to scan the ear canal, and the user should concentrate on only the scanning motion. Then the display can be read. A thermopile radiation sensor is supported within a probe 18 at the opposite end of the housing 14. The extension 18 extends orthogonally from an intermediate extension 20 which extends at an angle of about 15 degrees from the housing 14. As such, the head of the detector, including the extension 18 and 20, has the appearance of a conventional otoscope. An on/off switch 22 is positioned on the housing.

Figure 4:
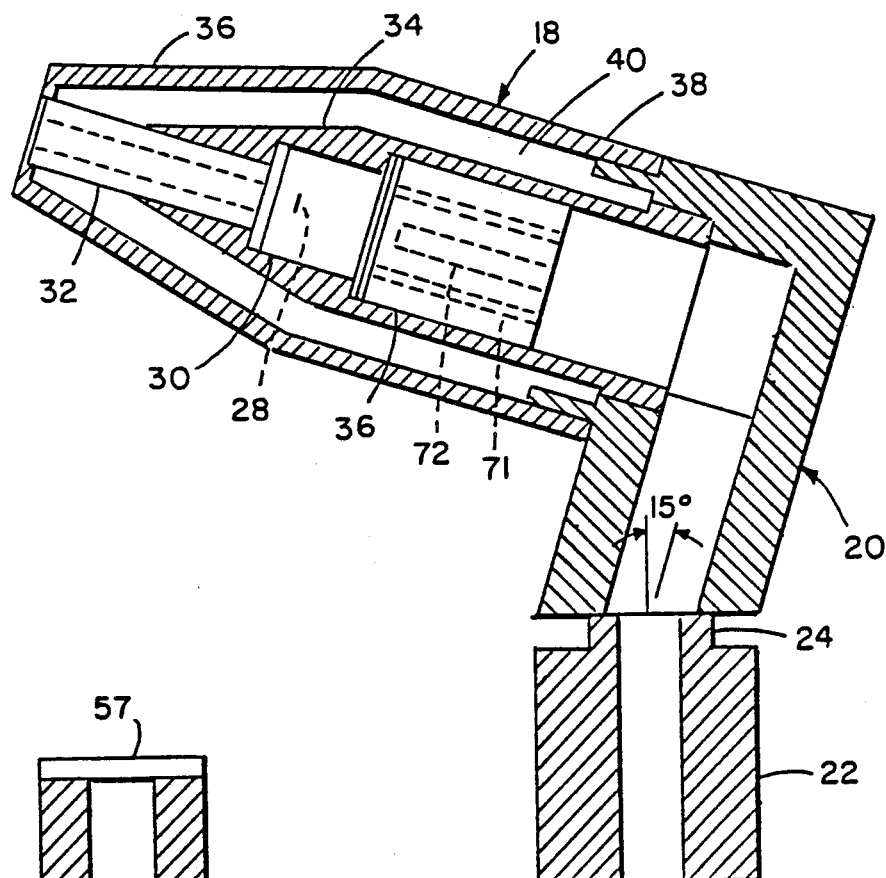
FIG. 4 is a cross-sectional view of the extensions of the detector of FIG. 1 in which the thermopile radiation sensor is positioned.

A cross-sectional view of the extension of the detector is illustrated in FIG. 4. A base portion 23 is positioned within the housing 14, and the housing clamps about a groove 24. As noted, the portion 20 extends at about a 15 degree angle from the housing and thus from the base portion 22. The extension 18 is tapered toward its distal end at 26 so that it may be comfortably positioned in the ear to view the tympanic membrane and/or ear canal.

Figure 2A:
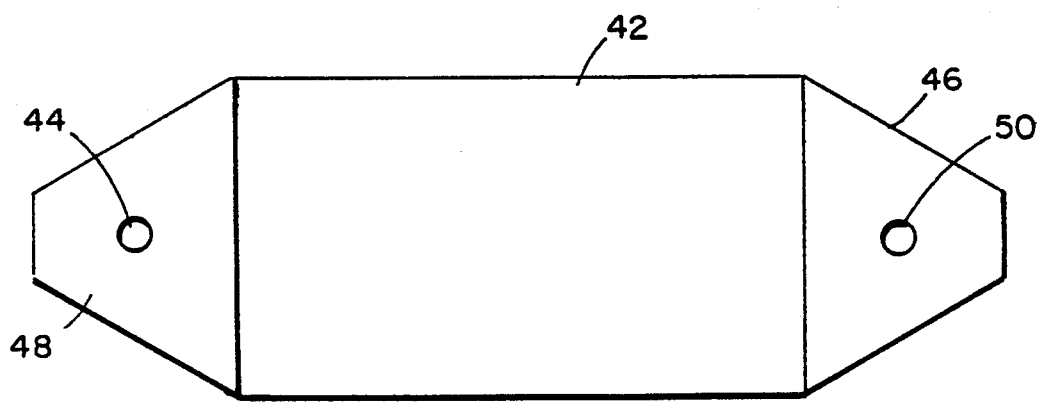
FIG. 2A is an illustration of a disposable sheet for covering a probe of the detector of FIG. 1.
Figures 3A, 3B:
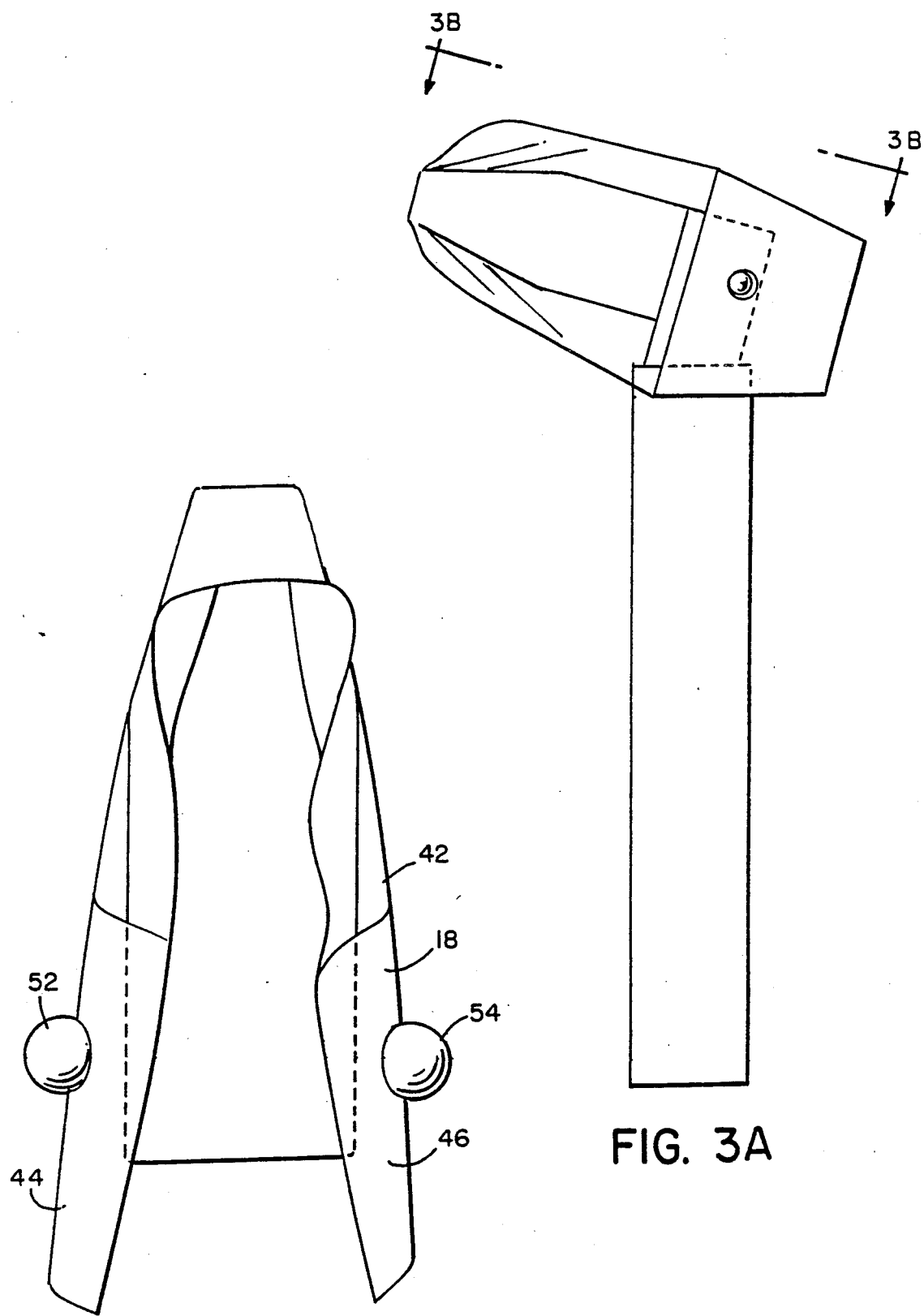
FIG. 3A is a side illustration of the sheet of FIG. 2A pulled over the probe of the radiation detector of FIG. 1.
FIG. 3B is a view of the sheet over the probe as viewed from line B—B of FIG. 3A.

A preferred disposable element to be used over the extension 18 is illustrated in FIG. 2A. It is a flat sheet 42 of one-half mil stretchable plastic such as polyethylene which is transparent to infrared. Reinforcement sheets 44 and 46 are provided at each end of the plastic sheet, and holes 48 and 50 are provided in the reinforced regions. The flat sheet may be stretched over the distal end of the extension 18 and pressed over retainers such as pins 52 and 54 protruding from the sides of the extension 18 as illustrated in FIGS. 3A and 3B. Alternatively, a material to which polyethylene adheres may be provided on the probe to retain the sheet. Although the flat sheet does not provide a close fit to the sides over the full length of the extension 18, it is sufficiently stretchable to form a neat fit at the end of the extension and is sufficiently flexible that it bends and causes no discomfort to the patient when the extension is seated in the ear.

The reinforcement sheets 44 and 46 serve as tabs which extend beyond the probe. Those tabs can be readily grasped for positioning the sheet on the probe and removing the sheet from the probe. Although the disposable cover could be formed without the reinforcement sheets, the stiffer reinforcement sheets make the disposable cover much easier to handle.

The diameter of the end of the probe is about ⅜ inch, and the sheet 42 is about two inches wide so that it folds over the probe end when stretched. The distance between the holes is about 4½ inches and that distance requires about ⅛ inch stretching of the sheet to secure it on the probe.

The edge at the end of the probe is rounded so that when the probe is inserted into the ear it can be rotated somewhat without discomfort to the patient. The probe is also curved like an otoscope to avoid interference with the ear. By thus rotating the probe, the ear canal is scanned and, at some orientation of the probe during that scan, one can be assured that the maximum temperature is viewed. Since the ear canal cavity leading to the tympanic area is the area of highest temperature, the instrument is set in a peak detection mode, and the peak detected during the scan is taken as the tympanic temperature.

An infrared reading of tympanic temperature, as opposed to an electronic thermometer reading of oral temperature, allows for a very inexpensive disposable. The disposable need not be sufficiently rugged to prevent cutting by teeth and the resultant contamination as is the case with an oral thermometer.

Figure 2B:
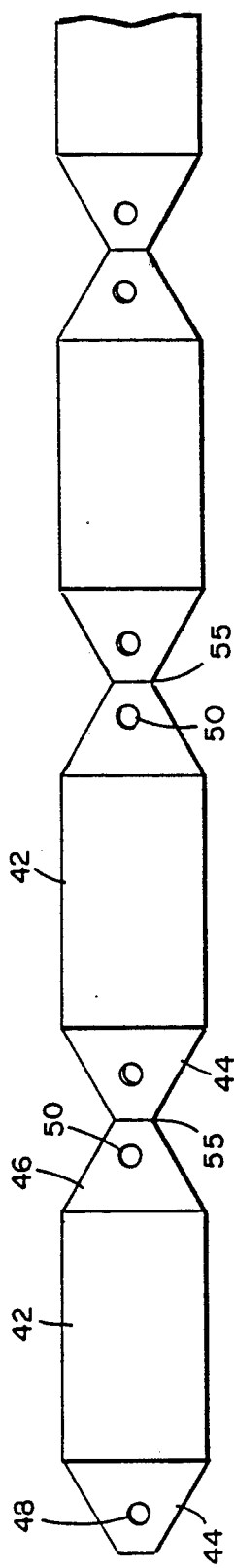
FIG. 2B is an illustration of a tape of the disposable sheets of FIG. 2A.

Preferably, individual sheets are torn from a tape of sheets illustrated in FIG. 2B. Sheets are formed from a continuous tape of polyethylene. Adhesive tape is placed periodically along the tape to provide reinforcements. The tape is stamped to provide the levels at the ends of each sheet and to provide the holes 48 and 50. The reinforcement tape and polyethylene may be perforated at 55 to facilitate tearing of individual sheets from the tape.

Figure 2D:
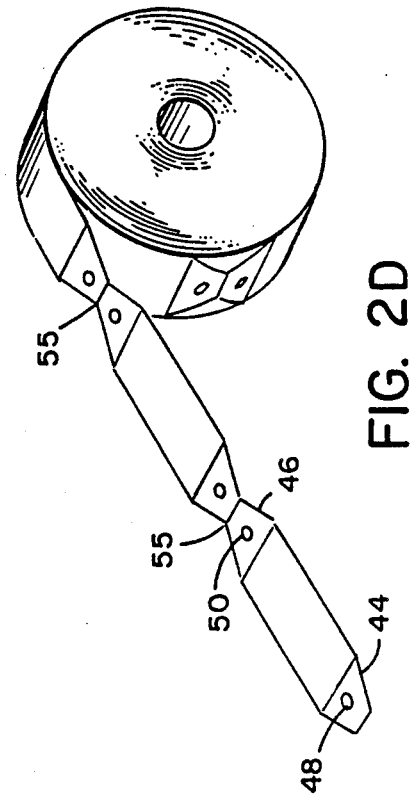
FIG. 2D is an illustration of a roll of such sheets.
Figure 2C:
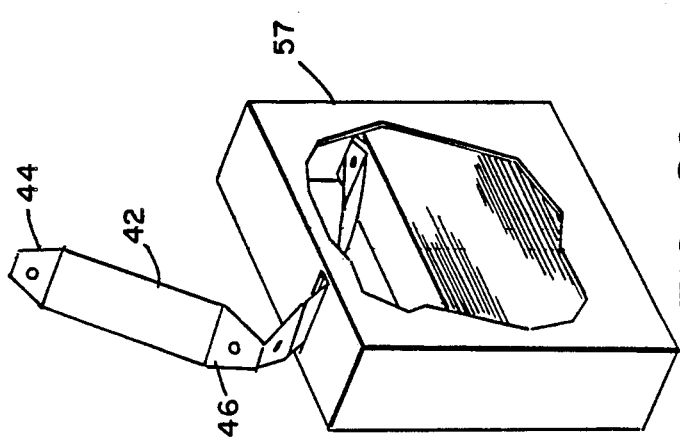
FIG. 2C is a perspective view of a carton containing a stack of the sheets formed by a z fold of the tape of FIG. 2B.

As illustrated in FIG. 2C, the tape may be folded in a z-fold fashion to form a stack of the disposable sheets packaged in a carton 57. As each cover is torn off, another appears. Alternatively, the tape may be provided in a roll as illustrated in FIG. 2D. The roll may also be placed in a carton. In either case, the carton may be provided with adhesive so that it can be mounted to the side of the housing 14 in an approach like that used with electronic thermometers.

As illustrated in FIG. 4, a thermopile 28 is positioned within a can 30 to view the infrared radiation in the ear canal through a tube 32. Both the base can 30 and the tube 32 are in close thermal contact with a conductive thermal mass including an annular member 34 and a plug 36 of copper. The outer sleeve 38 of the extension 18 and the intermediate extension 20 are of plastic material of low thermal conductivity. The sleeve 38 is separated from the thermal mass 34 by an insulating air space 40. The taper of the thermal mass 34 permits the insulating space to the end of the extension while minimizing the thermal resistance from the end of the tube 32 to the thermopile, a parameter discussed in detail below. The inner surface of the plastic sleeve 38 may be coated with a good thermal conductor to distribute across the entire sleeve any heat received from contact with the ear. Twenty mils of copper coating would be suitable.

Figure 5:
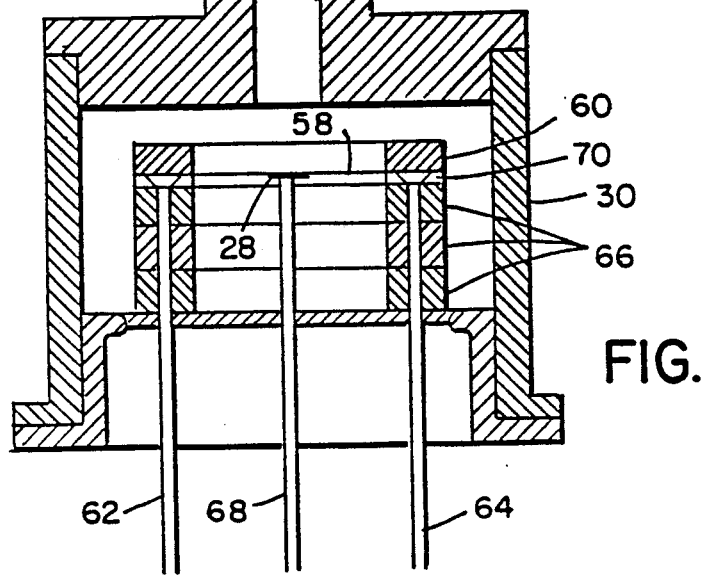
FIG. 5 is a cross-sectional view of the thermopile assembly of FIG. 4.

Details of the thermopile assembly within the can 30 are illustrated in FIG. 5. The tube 32 and can cylinder 30 are soldered together to form an integral unit in which a gaseous medium of low thermal conductivity such as xenon fills the tube and cylinder 30 and surrounds a thermopile flake 28. The tube is closed by a germanium window 57. The interior of the tube is plated with gold to improve its reflectance to better guide radiation to the flake.

An alternative to forming the tube 32 and can 30 as a single unit would be to use a conventional thermopile assembly with a window on the can and to position the waveguide tube in front of the can. However, to prevent contamination of the inner walls of the tube, a rigid window should be placed at the distal end of the tube. Two windows would diminish the radiation signal received by the thermopile.

The thermopile is mounted to the rear surface of a polyester sheet 58 (sold under the trademark Mylar) supported on the rear surface of a beryllium oxide ring 60. Contact to the thermopile is made through pins 62 and 64 which extend through a stack of beryllium oxide rings 66. Beryllium oxide is used because it is an electrical insulator yet a good thermal conductor. A case conductor 68 contacts the casing. Connection to the thermopile is by a conductive film printed on the sheet 58. To prevent abrasion of that film, the ring 60 is usually spaced slightly from the adjacent ring 66. As noted below, good thermal conduction is important in implementing the present invention, and it was found that the xenon gas filling the gap significantly reduced the conduction to the cold junction of the thermopile. In accordance with one feature of the present invention, that space 70 is filled with a conductive material. It is preferable that the material be filled with an epoxy of good thermal conductivity, but virtually any material offers a substantial improvement over the lack of conduction through the xenon.

One of the design goals of the device was that it always be in proper calibration without requiring a warm-up time. This precluded the use a heated target in a chopper unit or heating of the cold junction of the thermopile as was suggested in the above-mentioned O'Hara et.al. patent. To accomplish this design goal, it is necessary that the system be able to operate with the thermopile at any of a wide range of ambient temperatures and that the thermopile output have very low sensitivity to any thermal perturbations.

The output of the thermopile is a function of the difference in temperature between its warm junction, heated by radiation, and its cold junction which is in close thermal contact with the can 30. In order that the hot junction respond only to radiation viewed through the window 57, it is important that the tube 32 be, throughout a measurement, at the same temperature as the cold junction. To that end, changes in temperature in the tube 32 must be held to a minimum, and any such changes should be distributed rapidly to the cold junction to avoid any thermal gradients. To minimize temperature changes, the tube 32 and the can 30 are, of course, well insulated by means of the volume of air 40. Further, a high conductance thermal path is provided to the cold junction. The tube 32 and can 30 are in close thermal communication with the thermal masses 34 and 36, and the high conductivity and thickness of the thermal masses increase the thermal conductance. A high thermal conductivity epoxy, solder or the like joins the tube, can and thermal masses. The solder or epoxy provides a significant reduction in thermal resistance. Where solder is used, to avoid damage to the thermopile which is rated to temperatures of 125° C., a low temperature solder of indium-tin alloy which flows at 100° C. is allowed to flow into the annular mass 34 to provide good thermal coupling between all elements.

The thermal resistance from the outer surface of the plastic sleeve 38 to the conductive thermal mass is high to minimize thermal perturbations to the inner thermal mass. To minimize changes in temperature of the tube 32 with any heat transfer to the tube which does occur, the thermal mass of the tube 32, can 30, annular mass 34 and plug 36 should be large. To minimize thermal gradients where there is some temperature change in the tube during measurement, the thermal resistance between any two points of the thermal mass should be low.

Thus, due to the large time constant of the thermal barrier, any external thermal disturbances, such as when the extension contacts skin, only reach the conductive thermal mass at extremely low levels during a measurement period of a few seconds; due to the large thermal mass of the material in contact with the cold junction, any such heat transfer only causes small changes in temperature; and due to the good thermal conductance throughout the thermal mass, any changes in temperature are distributed quickly and are reflected in the cold junction temperature quickly so that they do not affect temperature readings.

The thermal RC time constant for thermal conduction through the thermal barrier to the thermal mass and tube should be at least two orders of magnitude greater than the thermal RC time constant for the temperature response of the cold junction to heat transferred to the tube and thermal mass. The RC time constant for conduction through the thermal barrier is made large by the large thermal resistance through the thermal barrier and by the large thermal capacitance of the thermal mass. The RC time constant for response of the cold junction is made low by the low resistance path to the cold junction through the highly conductive copper tube, can and thermal mass, and the low thermal capacitance of the stack of beryllium oxide rings and pin conductors to the thermopile.

Although the cold junction capacitance is naturally low, there are size constraints in optimizing the thermal capacitance of the thermal mass, the thermal resistance through the thermal barrier and the internal thermal resistance. Specifically, the external thermal resistance can be increased by increased radial dimensions, the capacitance of the thermal mass can be increased by increasing its size, and the thermal resistance through the longitudinal thermal path through the tube can be decreased by increasing its size. On the other hand, the size must be limited to permit the extension to be readily positioned and manipulated within the ear.

Besides the transfer of heat from the environment, another significant heat flow path to the conductive thermal mass is through leads to the system. To minimize heat transfer through that path, the leads are kept to small diameters. Further, they are embedded in the plug 36 through bores 70; thus, any heat brought into the system through those leads is quickly distributed throughout the thermal mass, and only small changes in temperature and small gradients result.

Because the temperature of the thermal mass is not controlled, and the response of the thermopile 28 is a function of its cold junction temperature, the cold junction temperature must be monitored. To that end, a thermistor is positioned at the end of a central bore 72 in the plug 36.

Figure 6:
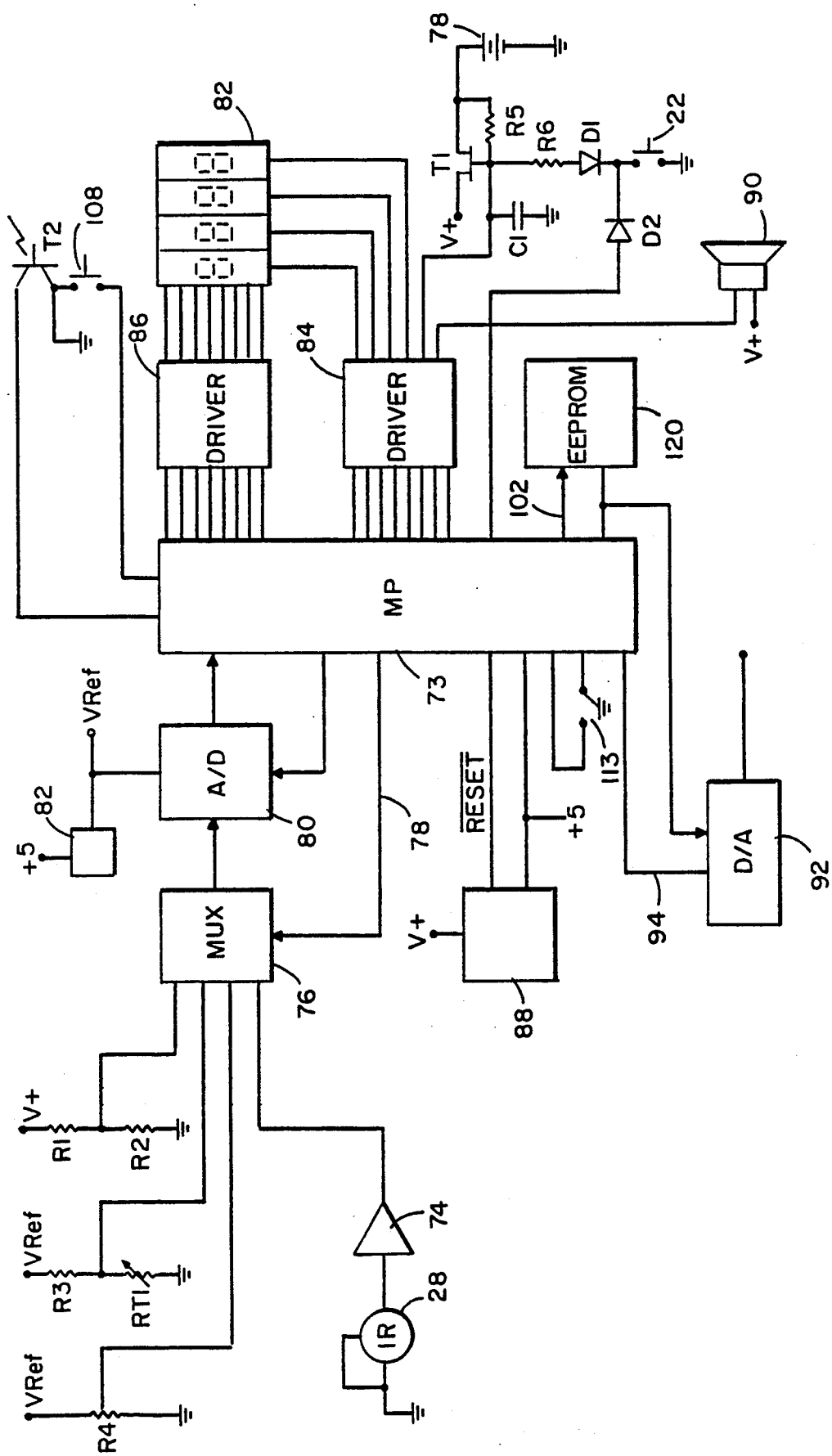
FIG. 6 is a block diagram of the electronic circuit of the detector of FIG. 1.

A schematic illustration of the electronics in the housing 14, for providing a temperature readout on display 16 in response to the signal from the thermopile, is presented in FIG. 6. The system is based on a microprocessor 73 which processes software routines included in read only memory within the processor chip. The processor may be a 6805 processor sold by Motorola.

The voltage generated across the thermopile 28 due to a temperature differential between the hot and cold junctions is amplified in an operational amplifier 74. The analog output from the amplifier 74 is applied as one input to a multiplexer 76. Another input to the multiplexer 76 is a voltage taken from a voltage divider R1, R2 which is indicative of the potential V. from the power supply 78. A third input to the multiplexer 76 is the potential across a thermistor RT1 mounted in the bore 72 of block 36. The thermistor RT1 is coupled in a voltage divider circuit with R3 across a reference potential VRef. The final input to the multiplexer is a potential taken from a potentiometer R4 which may be adjusted by a user. The system may be programmed to respond to that input in any of a number of ways. In particular, the potentiometer may be used as a gain control or as a DC offset control.

At any time during the software routine of the microprocessor 73, one of the four inputs may be selected by the select lines 78. The selected analog signal is applied to a multiple slope analog system 80 used by the microprocessor in an integrating analog-to-digital conversion 80. The subsystem 80 may be a TSC500A sold by Teledyne. It utilizes the reference voltage VRef from a reference source 82. The microprocessor 73 responds to the output from the convertor 80 to generate a count indicative of the analog input to the convertor.

The microprocessor drives four 7-segment LED displays 82 in a multiplexed fashion. Individual displays are selected sequentially through a column driver 84, and within each selected display the seven segments are controlled through segment drivers 86.

When the switch 22 on the housing is pressed, it closes the circuit from the battery 78 through resistors R5 and R6 and diode D1 to ground. The capacitor C1 is quickly charged, and field effect transistor T1 is turned on. Through transistor T1, the V+ potential from the storage cell 78 is applied to a voltage regulator 86. The regulator 86 provides the regulated +5 volts to the system. It also provides a reset signal to the microprocessor. The reset signal is low until the +5 volt reference is available and thus holds the microprocessor in a reset state. When the +5 volts is available, the reset signal goes high, and the microprocessor begins its programmed routine.

When the switch 22 is released, it opens its circuit, but a charge is maintained on capacitor C1 to keep transistor T1 on. Thus, the system continues to operate. However, the capacitor C1 and transistor T1 provide a very simple watchdog circuit. Periodically, the microprocessor applies a signal through driver 84 to the capacitor C1 to recharge the capacitor and thus keep the transistor T1 on. If the microprocessor should fail to continue its programmed routine, it fails to charge the capacitor C1 within a predetermined time during which the charge on C1 leaks to a level at which transistor T1 turns off. Thus, the microprocessor must continue in its programmed routine or the system shuts down. This prevents spurious readings when the processor is not operating properly.

With transistor T1 on, the switch 22 can be used as an input through diode D2 to the microprocessor to initiate any programmed action of the processor.

In addition to the display, the system has a sound output 90 which is driven through the driver 84 by the microprocessor.

In order to provide an analog output from the detector, a digital-to-analog convertor 92 is provided. When selected by line 94, the convertor converts serial data on line 96 to an analog output made available to a user.

In accordance with one aspect of the present invention, both calibration and characterization data required for processing by the microprocessor may be stored in an electrically erasable programmable read only memory (EEPROM) 100. The EEPROM may, for example, be a 93c46 sold by International CMOS Technologies, Inc. The data may be stored in the EEPROM by the microprocessor when the EEPROM is selected by line 102. Once stored in the EEPROM, the data is retained even after power down. Thus, though electrically programmable, once programmed the EEPROM serves as a virtually nonvolatile memory.

Prior to shipment, the EEPROM may be programmed through the microprocessor to store calibration data for calibrating the thermistor and thermopile. Further, characterization data which defines the personality of the infrared detector may be stored. For example, the same electronics hardware, including the microprocessor 73 and its internal program, may be used for a tympanic temperature detector in which the output is accurate in the target temperature range of about 60° F. to a 110° F. or it may be used as an industrial detector in which the target temperature range would be from about 0° F. to 100° F. Further, different modes of operation may be programmed into the system. For example, several different uses of the sound source 90 are available.

Figure 7:
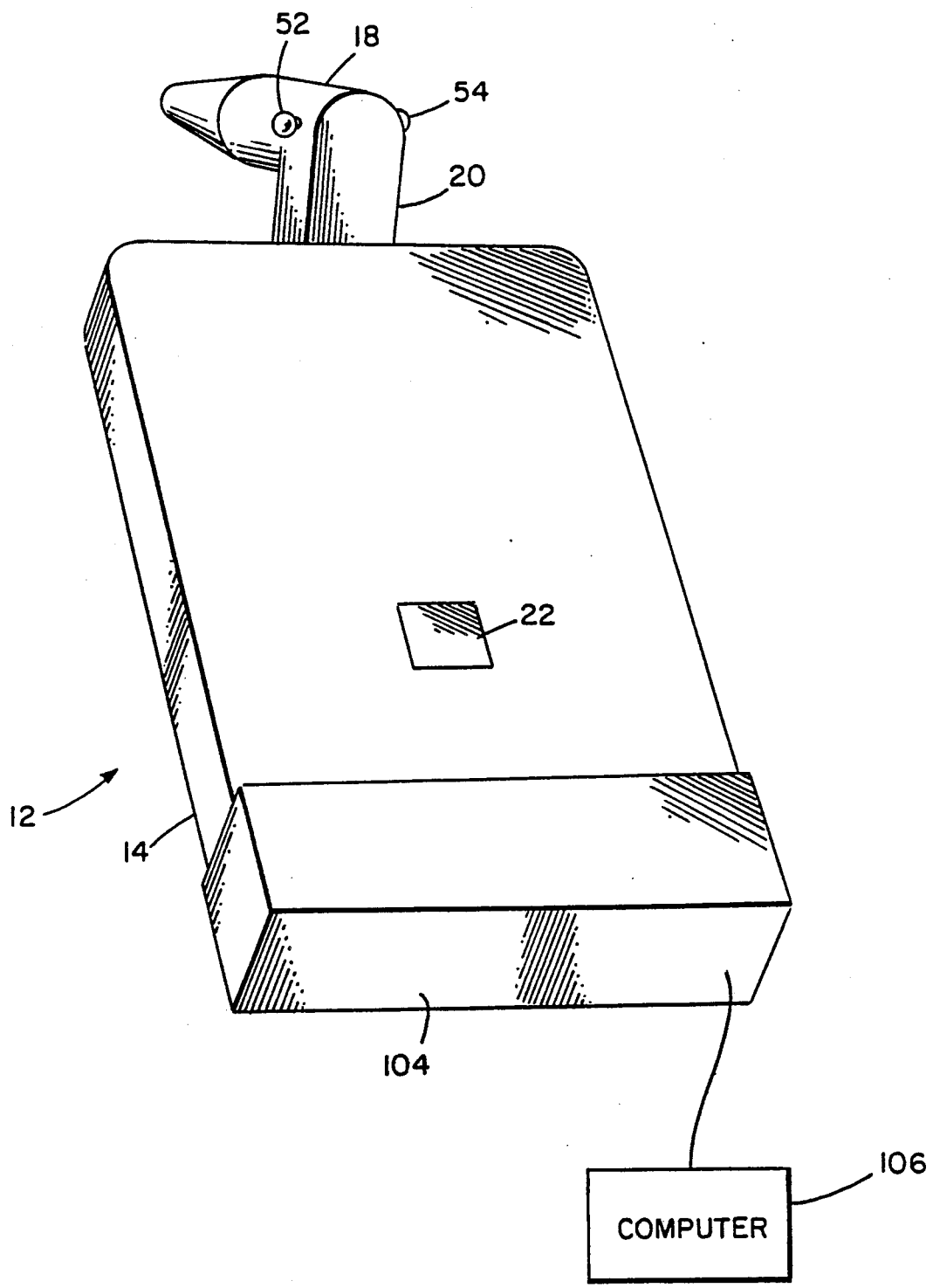
FIG. 7 illustrates a boot positioned on the detector of FIG. 1 during a calibration procedure.

Proper calibration of the detector is readily determined and the EEPROM is readily programmed by means of an optical communication link which includes a transistor T2 associated with the display. As illustrated in FIG. 7, a communication boot 104 may be placed over the end of the detector during a calibration/characterization procedure. A photodiode in the boot generates a digitally encoded optical signal which is filtered and applied to the detector T2 to provide an input to the microprocessor 73. In a reverse direction, the microprocessor, may communicate optically to a detector in the boot by flashing specific segments of the digital display 82. Through that communication link, an outside computer 106 can monitor the outputs from the thermistor and thermopile and perform a calibration of the devices. A unit to be calibrated is pointed at each of two black body radiation sources while the microprocessor 73 converts the signals and sends the values to the external computer. The computer is provided with the actual black body temperatures and ambient temperature in the controlled environment of the detector, computes calibrator variables and returns those variables to be stored in the detector EEPROM. Similarly, data which characterizes a particular radiation detector may be communicated to the microprocessor for storage in the EEPROM.

A switch 108 is positioned behind a hole 110 (FIG. 1) in the radiation detector so that it may be actuated by a rigid metal wire or pin. Through that switch, the user may control some specific mode of operation such as converting the detector from degrees Fahrenheit to degrees centigrade. That mode of operation may be stored by the microprocessor 73 in the EEPROM so that the detector continues to operate in a specific mode until a change is indicated by closing the switch 108.

A switch 106 may be provided either internally or through the housing to the user to set a mode of operation of the detector. By positioning the switch at either the lock position, the scan position or a neutral position, any of three modes may be selected. The first mode is the normal scan mode where the display is updated continuously. A second mode is a lock mode where the display locks after a selectable delay and then remains frozen until power is cycled or, optionally, the power-on button is pushed. The sound source may be caused to sound at the time of lock. The third mode is the peak mode where the display reads the maximum value found since power-on until power is cycled or, optionally, the power-on button is pushed.

The processor determines where the voltage from the divider R1, R2 drops below each of two thresholds.

Below the higher threshold, the processor periodically enables the sound source to indicate that the battery is low and should be replaced but allows continued readout from the display. Below the lower threshold, the processor determines that any output would be unreliable and no longer displays temperature readings. The unit would then shut down upon release of the power button.

To provide a temperature readout, the microprocessor makes the following computations: First the signal from thermistor RT1 is converted to temperature using a linear approximation. Temperature is defined by a set of linear equations $$y = M(x - xo) + b$$

where x is an input and xo is an input end point of a straight line approximation. The values of M, xo and b are stored in the EEPROM after calibration. Thus, to obtain a temperature reading from the thermistor, the microprocessor determines from the values of xo the line segment in which the temperature falls and then performs the computation for y based on the variables M and b stored in the EEPROM.

A fourth power representation of the ambient temperature is then obtained by a lookup table in the processor ROM. The sensed radiation may be corrected using a calibration factor, a sensor gain temperature coefficient, the detected ambient temperature and a calibration temperature stored in the EEPROM. The corrected radiation signal and the fourth power of the ambient temperature are summed, and the fourth root is taken. The fourth root calculation is also based on a linear approximation which is selected according to the temperature range of interest for a particular unit. Again, the break points and coefficients for each linear approximation are stored in the EEPROM and are selected as required. To the thus computed target temperature is added an adjustment factor which may, for example, allow for a reading which closely corresponds to oral and/or core temperature based on the knowledge of the relationship of oral and/or core temperature to tympanic temperature. Also added to the calculated temperature is a user tweak obtained from resistor R4.

An additional factor based on ambient temperature may also be included as an adjustment. The temperature of the ear $T_e$ which is sensed by the thermopile is not actually the core temperature $T_c$. There is thermal resistance between $T_c$ and $T_e$. Further, there is thermal resistance between the sensed ear temperature and the ambient temperature. The result is a sense temperature $T_e$ which is a function of the core temperature of interest and the ambient temperature. Based on an assumed constant c which is a measure of the thermal resistances between $T_c$, $T_e$ and $T_a$, core temperature can be computed as $$T_c = \frac{T_e - cT_a}{(1 - c)}$$

This computation can account for a difference of from one-half to one degree between core temperature and sensed ear temperature, depending on ambient temperature.

The actual computations performed by the processor are as follows, where:
H is the radiation sensor signal
Hc is corrected H (deg $K^4$)
Tamb is ambient temperature (deg F)
Taf is 4th power of Tamb (deg $K^4$)
Tt is target temperature (deg F)
Tz is ambient temp during cal (deg F)
Td is the displayed temperature
Rt is the thermistor signal
Kh is a radiation sensor gain cal factor
Zt is a thermistor zero cal factor
Kt is a sensor gain temperature coefficient (%/deg F)
s is the Stefan-Boltzmann constant
F is an adjustment factor
Ut is a user tweak
Tamb(deg F) = Thermistor lookup table (Rt) − Zt
Hc(deg $K^4$) = Kh * H * (1 + Kt * (Tamb − Tz))/s
Taf(deg $K^4$) = 4th power lookup table (Tamb)
Tt(deg F) = (Hc + Taf)$^{\frac{1}{4}}$ (Final lookup table)
Tt(deg C) = (5/9) * (Tf(deg F) − 32) optional
$Td = Tt + F + Ut$ The following is a list of the information which may be contained in the EEPROM and therefore be programmable at the time of calibration:
Radiation sensor offset
Radiation sensor gain
Radiation sensor temperature coefficient
Thermistor offset
Ambient temperature at calibration
Thermistor lookup table
Final temperature lookup table
Adjustment factor F
Sound source functions:
   Beep at button push in lock mode
      none/20/40/80 milliseconds long
   Beep at lock
      none/20/40/80 milliseconds long
   Beep at power down
      none/20/40/80 milliseconds long
   Beep at lowbattery
      none/20/40/80 milliseconds long
      interval 1/2/3 sec
      single/double beep
Timeout functions:
   Time to power-down
      0.5 to 128 sec in 0.5 sec increments
   Delay until lock
      0.5 to 128 sec in 0.5 sec increments
Other functions:
   Power-on button resets lock cycle
   Power-on button resets peak detect
   Display degrees C / degrees F
   EEPROM "Calibrated" pattern to indicate that the device has been calibrated
   EEPROM checksum for a self-check by the processor FIGS. 8A–8D provide a flowchart of the firmware stored in the microprocessor 73. From reset when the instrument is turned on, the system is initialized at 110 and the contents of the EEPROM are read into memory in the microprocessor at 112. At 114, the processor reads the state of power and mode switches in the system. At 116, the system determines whether a mode switch 113 has placed the system in a self-test mode. If not, all eights are displayed on the four-digit display 82 for a brief time. At 120, the system performs all A-to-D conversions to obtain digital representations of the thermopile output and the potentiometer settings through multiplexor 76.

The system then enters a loop in which outputs dictated by the mode switch are maintained. First the timers are updated at 122 and the switches are again read at 124. When the power is switched off, from 126 the system enters a power down loop at 128 until the system is fully down. At 130, the mode switch is checked and if changed the system is reset. Although not in the tympanic temperature detector, some detectors have a mode switch available to the user so that the mode of operation can be changed within a loop.

At 132, 136 and 140, the system determines its mode of operation and enters the appropriate scan process 134, lock process 138 or Peak process 142. In a scan process, the system updates the output to the current reading in each loop. In a lock process, the system updates the output but locks onto an output after some period of time. In the peak process, the system output is the highest indication noted during a scan. In each of these processes, the system may respond to the programming from the EEPROM to perform any number of functions as discussed above. In the peak process which is selected for the tympanic temperature measurement, the system locks onto a peak measurement after a preset period of time. During assembly, the system may be set at a test mode 144 which will be described with respect to FIG. 8D.

In any of the above-mentioned modes, an output is calculated at 146. Then the system loops back to step 122. The calculation 146 is illustrated in FIG. 8B.

Figure 8A:
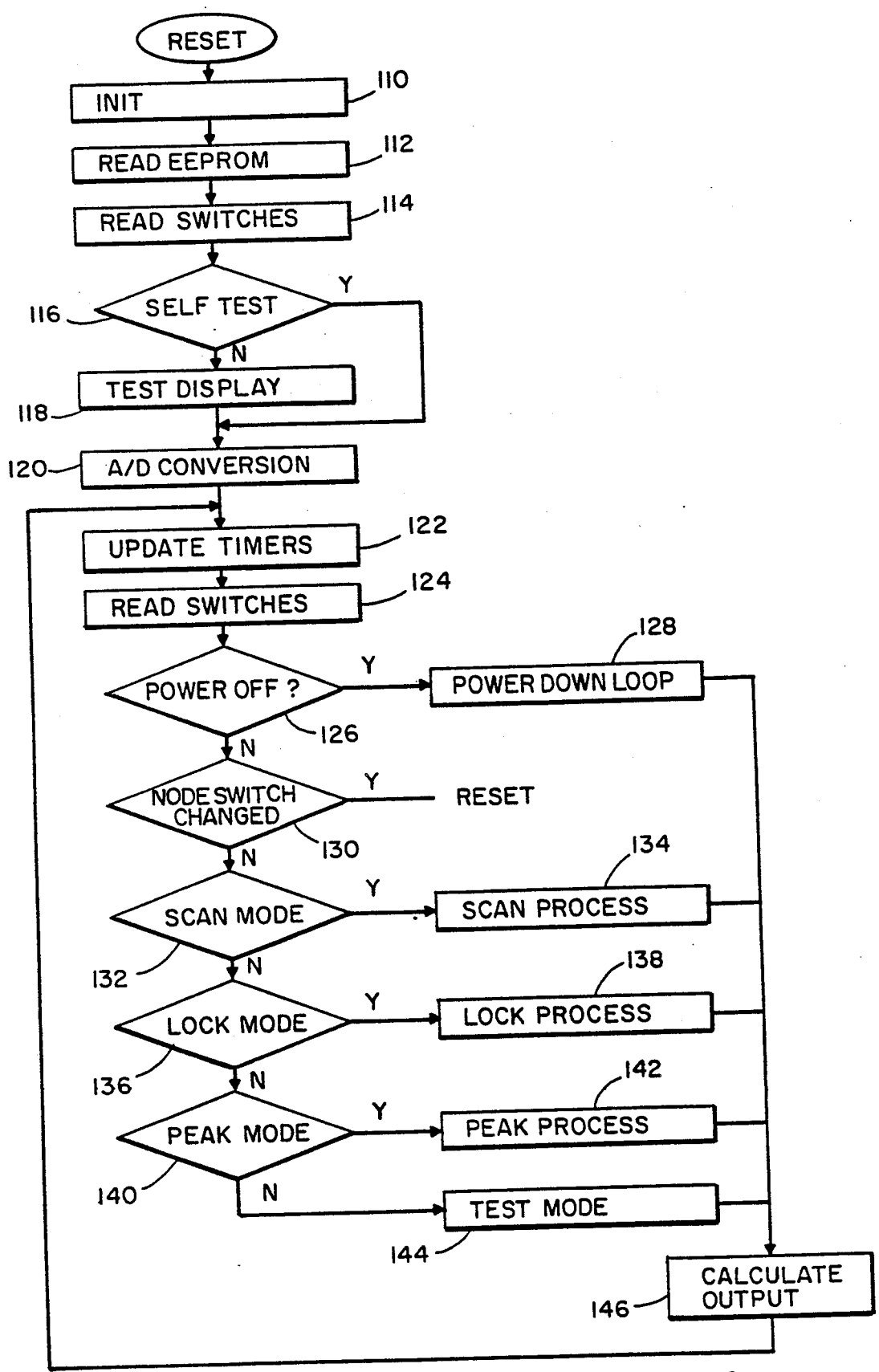
Figure 8B:
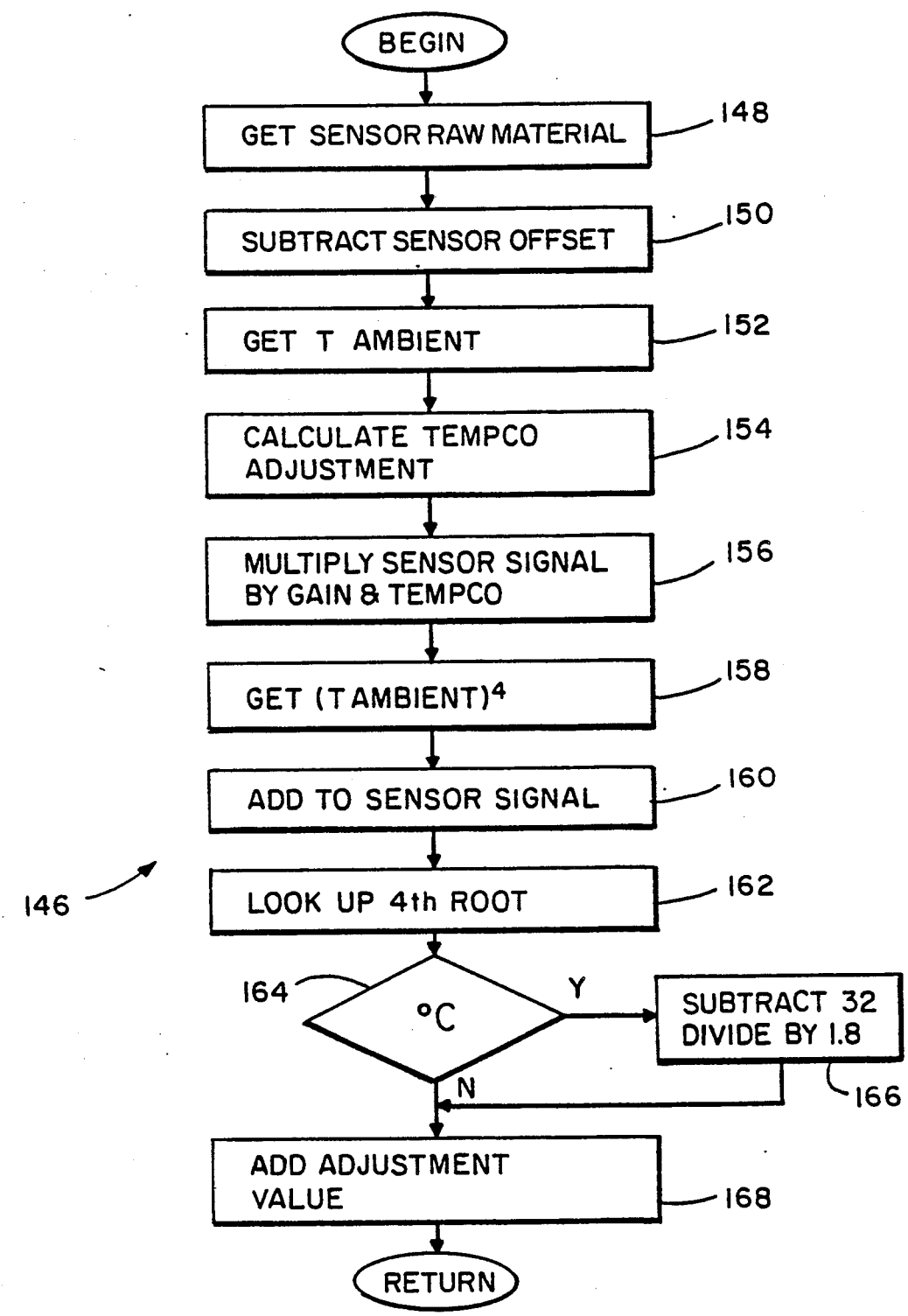

At 148 in FIG. 8B, the raw sensor data is obtained from memory. The sensor offset taken from the EEPROM is subtracted at 150, end the ambient temperature previously obtained from the potentiometer RT1 is accessed at 152. The temperature coefficient adjustment is calculated at 154. At 156, the sensed signal is multiplied by the gain from EEPROM and by the temperature coefficient. At 158, the fourth power of the ambient temperature is obtained, and at 160 it is added to the sensor signal. At 162, the fourth root of the sum is obtained through a lookup table. Whether the display is in degrees centigrade or degrees Fahrenheit is determined at 164. If in degrees centigrade, a conversion is performed at 166. At 168, adjustment values, including that from the potentiometer R4, are added.

Analog-to-Digital conversion is performed periodically during an interrupt to the loop of FIG. 8A which occurs every two milliseconds. The interrupt routine is illustrated in FIG. 8C. Timer counters are updated at 170. A-to-D conversions are made from 172 only every 100 milliseconds when a flag has been set in the prior interrupt cycle. During most interrupts, an A/D conversion does not occur. Then, the 100-millisecond counter is checked at 174, and if the count has expired, a flag is set at 176 for the next interrupt. The flag is checked at 178 and, if found, the display is updated at 180. The system then returns to the main loop of FIG. 8A.

Where the 100 millisecond flag is noted at 172, an A-to-D conversion is to be performed. The system first determines at 182 whether a count indicates there should be a conversion of the thermopile output at 184 or a conversion of the thermistor output at 186. The thermopile sensor conversion is performed nine out of ten cycles through the conversion loop. At 188, the system checks to determine whether a conversion is made from the potentiometer R4 or from the battery voltage divider R1, R2 at 192. These conversions are made alternately.

FIG. 8D illustrates the self-test sequence which is called by the mode switch 113 only during assembly. During the test, the beeper sounds at 182 and all display segments are displayed at 184. Then the system steps each character of the display from zero through nine at 186. The system then enters a test loop. At 188, the system senses whether the button 108 has been pressed. If so, a display counter is incremented at 190. The display for the unit then depends on the count of the display counter. With the zero count, the adjustment potentiometer value is displayed at 192. Thereafter, if the display counter is incremented by pressing the button 108, the raw sensor data is displayed. With the next increment, ambient temperature is displayed at 196, and with the next increment, the raw output from the ambient temperature sensor RT1 is displayed. With the next increment, the battery voltage is displayed. After the test, the assembler sets the mode switch to the proper operating mode.

While this invention has been particularly shown and described with references to preferred embodiments thereof, it will be understood by those skilled in the art that various changes in form and details may be made therein without departing from the spirit and scope of the invention as defined by the appended claims.

We claim:

1. A radiation detector comprising:
   a thermopile mounted within a thermal mass and having a junction thermally coupled to the thermal mass;
   a thermally conductive tube coupled to the thermal mass for guiding radiation to the thermopile from an external target; and
   a thermal barrier surrounding the thermal mass and tube;
   the outer thermal RC time constant for thermal conduction through the thermal barrier to the thermal mass and tube is at least two orders of magnitude greater than the inner thermal RC time constant for the temperature response of the cold junction to heat transferred to the tube and thermal mass through the thermal barrier.

2. A radiation detector as claimed in claim 1 wherein the outer RC time constant is at least three orders of magnitude greater than the inner RC time constant.

3. A radiation detector as claimed in claim 1 wherein the inner RC time constant is about ½ second or less.

4. A radiation detector as claimed in claim 1 comprising a continuous low thermal resistance path from the end of the tube to the junction of the thermopile.

5. A radiation detector as claimed in claim 1 wherein the thermopile is mounted within a low conductivity gaseous environment which extends through the length of the conductive tube.

6. A radiation detector as claimed in claim 1 wherein the thermopile is mounted to a film suspended within a ring, the ring being supported on electrically conductive pins extending through an adjacent ring to the side of the film on which the thermopile is mounted, the film being spaced from the adjacent ring, the rings and thermopile being surrounded by a low conductivity gaseous volume, the radiation detector further comprising the improvement wherein the space between the film and the adjacent ring through which the conductors extend is filled with thermally conductive material.

7. A radiation detector as claimed in claim 1 wherein:
   the thermopile is mounted within a low conductivity gaseous volume within a can;
   the thermal mass comprises an annular member which surrounds the can and a length of the tube adjacent to the can, the annular member being tapered about its outer periphery toward the tube, and a conductive plug positioned behind the can within the annular member, the can, tube, annular member and plug being bonded together by high thermal conductivity material; and the thermal barrier comprises a sleeve spaced from the thermal mass and tube, the sleeve being tapered toward the end of the tube away from the can.

8. A radiation detector as claimed in claim 1 adapted to provide an indication of tympanic temperature.

9. In a thermopile assembly comprising a thermopile mounted to a film suspended within a ring, the ring being supported on electrically conductive pins extending through an adjacent ring to the side of the film on which the thermopile is mounted, the film being spaced from the adjacent ring, and the rings and thermopile being surrounded by a low conductivity gaseous volume, the improvement wherein the space between the film and the adjacent ring through which the conductors extend is filled with thermally conductive material.

10. A radiation detector comprising a thermopile mounted within a can and a waveguide tube of lesser internal diameter than the can and integral with the can, the tube having an airtight window at a distal end thereof and directing radiation which passes through the window to the thermopile, a gaseous environment having a thermal conductivity significantly lower than that of air being maintained about the thermopile within the can and through the length of the tube.

11. A tympanic temperature detector comprising:
a housing adapted to be held by hand;
an extension from the housing adapted to be inserted into an ear, the extension supporting a radiation sensor and having a window at the end thereof through which the sensor receives radiation from a tympanic membrane area;
a temperature display on the housing for displaying tympanic temperature;
battery powered electronics in the housing for converting radiation sensed by the sensor to temperature displayed by the display; and
a removable plastic sheet stretched over the end of the extension, the sheet having holes at opposite ends thereof which are secured to retaining members on the side of the extension to retain the sheet on the extension.

12. A tympanic temperature detector as claimed in claim 11 wherein the radiation sensor is a thermopile, the cold junction of which is allowed to follow ambient temperature.

13. A tympanic temperature detector as claimed in claim 12 wherein the radiation sensor is a thermopile mounted within a thermal mass in the extension and having a junction thermally coupled to the thermal mass, a thermally conductive tube is coupled to the thermal mass for guiding radiation to the thermopile from an external target and a thermal barrier surrounds the thermal mass and tube, the outer thermal RC time constant for thermal conduction through the thermal barrier to the thermal mass and tube is at least two orders of magnitude greater than the inner thermal RC time constant for the temperature response of the cold junction to heat transferred to the tube and thermal mass through the thermal barrier.

14. A tympanic temperature detector as claimed in claim 13 wherein the inner thermal RC time constant is about ½ second or less.

15. A tympanic temperature detector as claimed in claim 12 further comprising an airtight waveguide tube mounted in the extension integral with a can containing the thermopile, the tube guiding radiation from the window to the thermopile and being filled with a low conductivity gas.

16. A tympanic temperature detector as claimed in claim 12 wherein the thermopile is mounted to a film suspended within a ring, the ring being supported on electrically conductive pins extending through an adjacent ring to the side of the film on which the thermopile is mounted, the film being spaced from the adjacent ring, the rings and thermopile being surrounded by a low conductivity gaseous volume, the radiation detector further comprising the improvement wherein the space between the film and the adjacent ring through which the conductors extend is filled with thermally conductive material.

17. A tympanic temperature detector as claimed in claim 12 wherein:
the thermopile is mounted within a low conductivity gaseous volume within a can;
the thermal mass comprises an annular member which surrounds the can and a length of the tube adjacent to the can, the annular member being tapered about its outer periphery toward the tube, and a conductive plug positioned behind the can within the annular member, the can, tube, annular member and plug being bonded together by high thermal conductivity material; and
the thermal barrier comprises a sleeve spaced from the thermal mass and tube, the sleeve being tapered toward the end of the tube away from the can.

18. A tympanic temperature detector as claimed in claim 11 which provides a display of tympanic temperature within five seconds of inserting the extension into the ear.

19. A tympanic temperature detector as claimed in claim 11 wherein the radiation sensor is a thermopile and the window is positioned at the end of a waveguide tube integral with a can surrounding the thermopile, a low conductivity gaseous environment surrounding the thermopile within the can and extending through the length of the conductive tube.

20. A tympanic temperature detector as claimed in claim 11 further comprising a tape of said removable plastic sheets, individual sheets being adapted to be torn from the tape to be stretched over the end of the extension.

21. A tympanic temperature detector as claimed in claim 11 wherein the extension extends about orthogonally from an intermediate extension which extends at an angle of about 15 degrees from an end of the housing, the extension being curved outwardly along its length from its distal end.

22. A tympanic temperature detector as claimed in claim 11 further comprising a processor for providing the temperature displayed on the housing as a function of the received radiation compensated by an indication of ambient temperature to provide a core temperature approximation.

23. A tympanic temperature detector comprising:
a housing adapted to be held by hand;
an extension from the housing adapted to be inserted into an ear, the extension supporting a radiation sensor and having a window at the end thereof through which the sensor receives radiation from a tympanic membrane area;

a temperature display on the housing for displaying tympanic temperature;

battery powered electronics in the housing for converting radiation sensed by the sensor to temperature displayed by the display, the electronics including a processor for providing the temperature displayed on the housing as a function of the received radiation compensated by an indication of ambient temperature to provide a core temperature approximation.

24. A tympanic temperature detector comprising:

a housing adapted to be held by hand;

an extension from the housing adapted to be inserted into an ear, the extension supporting a thermopile radiation sensor and having a window at the end thereof through which the sensor receives radiation from a tympanic membrane area;

a temperature display on the housing for displaying tympanic temperature;

battery powered electronics in the housing for converting radiation sensed by the sensor to temperature displayed by the display;

a removable plastic sheet stretched over the end of the extension; and a thermal mass in the extension within which the thermopile is mounted, the thermopile having a junction thermally coupled to the thermal mass, and therein a thermally conductive tube is coupled to the thermal mass for guiding radiation to the thermopile from an external target, a thermal barrier surrounds the thermal mass and tube, and the outer thermal RC time constant for thermal conduction through the thermal barrier to the thermal mass and tube is at least two orders of magnitude greater than the inner thermal RC time constant for the temperature response of the cold junction to heat transferred to the tube and thermal mass through the thermal barrier.

25. A tympanic temperature detector as claimed in claim 24 wherein the inner thermal RC time constant is about ½ second or less.

26. A tympanic temperature detector comprising:

a housing adapted to be held by hand;

an extension from the housing adapted to be inserted into an ear, the extension supporting a radiation sensor and having a window at the end thereof through which the sensor receives radiation from a tympanic membrane area, the radiation sensor being a thermopile having a cold junction which is allowed to follow ambient temperature, the thermopile being mounted to a film suspended within a ring which is supported on electrically conductive pins extending through an adjacent ring to the side of the film on which the thermopile is mounted, the film being spaced from the adjacent ring and the rings and thermopile being surrounded by a low conductivity gaseous volume, the radiation detector further comprising the improvement wherein the space between the film and the adjacent ring through which the conductive pins extend is filled with thermally conductive material;

a temperature display on the housing for displaying tympanic temperature; and battery powered electronics in the housing for converting radiation sensed by the sensor to temperature displayed by the display.

27. A tympanic temperature detector comprising:

a housing adapted to be held by a hand;

an extension from the housing adapted to be inserted into an ear, the extension supporting a radiation sensor and having a window at the end thereof through which the sensor receives radiation from a tympanic membrane area, and wherein the extension extends about orthogonally from an intermediate extension which extends at an angle of about 15 from an end of the housing, the extension being curved outwardly along its length from its distal end;

a temperature display on the housing displaying tympanic temperatures; and battery powered electronics in the housing for converting radiation sensed by the sensor to temperature displayed by the display.

28. A radiation detector comprising:

a thermopile mounted within a thermal mass and having a junction thermally coupled to the thermal mass;

a thermally conductive tube coupled to the thermal mass for guiding radiation to the thermopile from an external target; and a thermal barrier surrounding the thermal mass and tube;

an inner thermal RC time constant for the temperature response of the cold junction to heat transferred to the tube and thermal mass through the thermal barrier along being about ½ second or less.

* * * * *

UNITED STATES PATENT AND TRADEMARK OFFICE
CERTIFICATE OF CORRECTION

PATENT NO. : 4,993,419

DATED : February 19, 1991

INVENTOR(S) : Francesco Pompei, Joseph M. Looney, Jr. and Philip R. Gaudet, Jr.

It is certified that error appears in the above-identified patent and that said Letters Patent is hereby corrected as shown below:

In Claim 24, Column 17, Line 28, change "therein" to --wherein--.

In Claim 27, Column 18, Line 26, change "15" to --15 degrees--.

Signed and Sealed this

Twenty-sixth Day of January, 1993

Attest:

STEPHEN G. KUNIN

*Attesting Officer*   *Acting Commissioner of Patents and Trademarks*